(No Model.)
J. T. T. KISINGER.
ANIMAL TRAP.
No. 449,857. Patented Apr. 7, 1891.
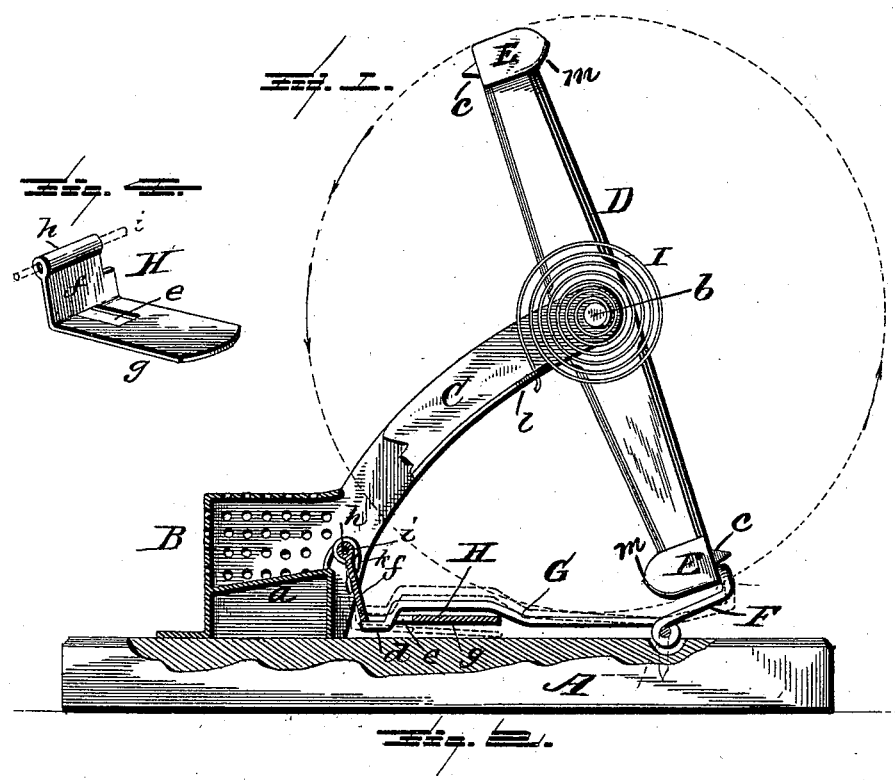
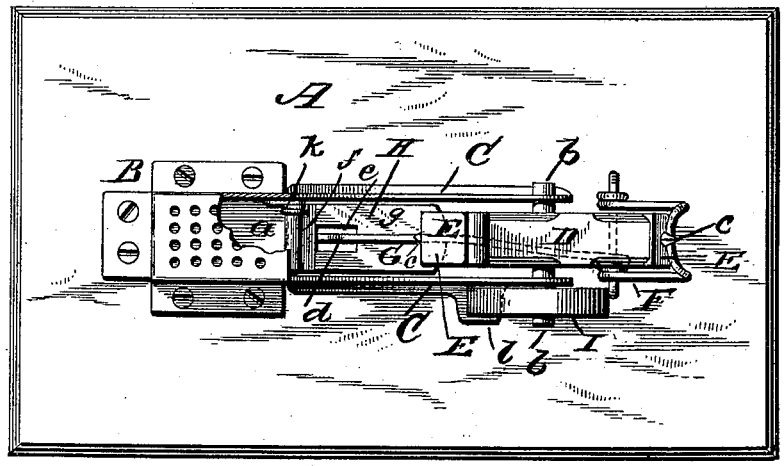
Witnesses
L. C. Hills
H. Sutherland
Inventor
John T. T. Kisinger,
per Chas. N. Fowler
Attorney

UNITED STATES PATENT OFFICE.

JOHN TETOR TILMON KISINGER, OF BELTON, MISSOURI.

ANIMAL-TRAP.

SPECIFICATION forming part of Letters Patent No. 449,857, dated April 7, 1891.

Application filed December 11, 1890. Serial No. 374,342. (No model.)

*To all whom it may concern:*

Be it known that I, JOHN TETOR TILMON KISINGER, a citizen of the United States, residing at Belton, in the county of Cass and State of Missouri, have invented certain new and useful Improvements in Animal-Traps; and I do hereby declare that the following is a full, clear, and exact description of the same, reference being had to the annexed drawings, making a part of this specification, and to the letters of reference marked thereon.

Figure 1 of the drawings represents a side elevation of my improved animal-trap, partly in section; Fig. 2, a top plan view with the bait-receptacle partly in section; Fig. 3, a detail view in perspective of the trip which releases the latch. Fig. 4 represents a detail perspective view of the latch.

The present invention has relation to certain new and useful improvements in animal-traps; and it consists in the several details of construction substantially as shown in the drawings, and hereinafter described and claimed.

In the accompanying drawings, A represents a suitable support, to which are connected the operating parts of the trap, and B represents a perforated metal bait-receptacle of any preferred shape and size, the perforation allowing the odor of the bait to pass through.

The receptacle B has a platform $a$, upon which the bait rests, so as to elevate it above the support A, and has arms C extending out at an angle from a perpendicular to form bearing for the journals $b$ upon the sides of a double-headed hammer D, the heads E having spikes $c$, which extend in opposite directions, as shown.

To the platform A is suitably pivoted a latch F, having a rearwardly-extending arm G, bent as shown, and having at its extremity a catch $d$. The arm G of the latch extends over a trip H, and the catch portion thereof extends down through a slot $e$ in said trip and passes under the vertical wing $f$ of the trip to hold it stationary.

The trip H is of peculiar construction—that is to say, it consists of the vertical portion or wing $f$ and the horizontal portion $g$, the latter serving as a small platform upon which the animal steps when attempting to obtain access to the bait. The wing $f$ may be vertical or slightly on an incline, as it would make no material difference as to the operation of the trip, said trip having an eye $h$, through which passes a pin $i$, rigidly secured at its ends to the arms C, and a spring $k$, secured to the pin and bearing on the wing $f$, so as to bring the trip back to its normal position when pressure is removed from the platform $g$. One end of a flat coiled spring I is rigidly connected to one of the journals $b$ and the other end connected to a slotted plate $l$, extending laterally from one of the arms C.

In setting the trap the hammer D is turned in opposite directions from that indicated by the arrows until the spring is wound up or closely coiled, the beveled shoulders $m$ on the heads of the hammer allowing the heads to pass over the end of the latch as they are brought in contact therewith in winding up the spring I, while the flat side of the heads opposite to the beveled shoulders prevent the hammer from turning in the opposite direction by contact therewith of the latch F. The spring I being wound up and the hammer in position shown in Fig. 1, and the catch $d$ engaging with the lower edge of the wing $f$ of the trip H, as shown in Fig. 1, and bait placed in the receptacle B, the trap is now set and ready for work. As the rat or other animal passes onto the platform $g$ of the trip H, the platform will be depressed and the wing $f$ forced back, which will release the catch $d$, and the pressure of the hammer-head against the latch F will force it down out of engagement and the hammer release itself, and in its course (indicated by the arrows) strike the animal a powerful blow and at the same time force the spike into it and throw the animal off the platform. The hammer-head as it again comes in contact with the latch F will be held thereby, and the spring $k$ of the wing $f$ will bring it back to its normal position over the catch $d$, when the trap is again set automatically for another animal.

The spring I should be of such length and strength as to enable the trap to be several times automatically set and operated without the necessity of rewinding the spring.

Having now fully described my invention, what I claim as new, and desire to secure by Letters Patent, is—

In an animal-trap, the bait-receptacle B, having outwardly-extending arms C, the double-headed hammer pivoted thereto and having beveled shoulders $m$, and the spring I, operating on said hammer, in combination with the pivoted latch F, adapted to engage with the end of the hammer and terminating in a rearwardly-extending arm G and catch $d$, and the slotted trip H, operating therewith, substantially as and for the purpose set forth.

In testimony that I claim the above I have hereunto subscribed my name in the presence of two witnesses.

JNO. TETOR TILMON KISINGER.

Witnesses:
GEO. B. STROTHER,
S. D. SPRINKLE, Jr.